April 21, 1936.  J. B. DE COSTA  2,037,967
ROTARY DRILL
Filed Sept. 15, 1934    2 Sheets-Sheet 1
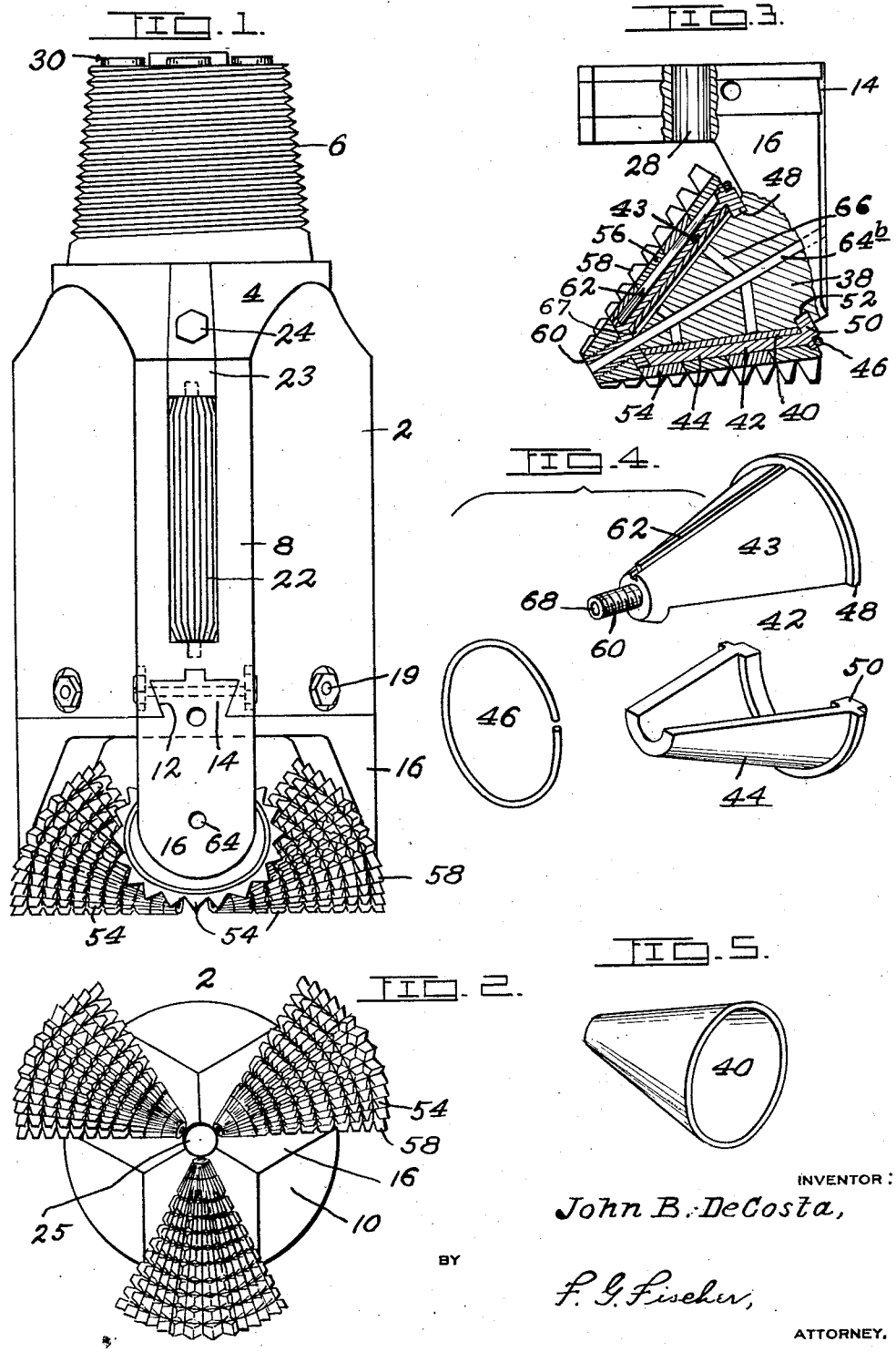
INVENTOR:
John B. DeCosta,
BY
F. G. Fischer,
ATTORNEY.

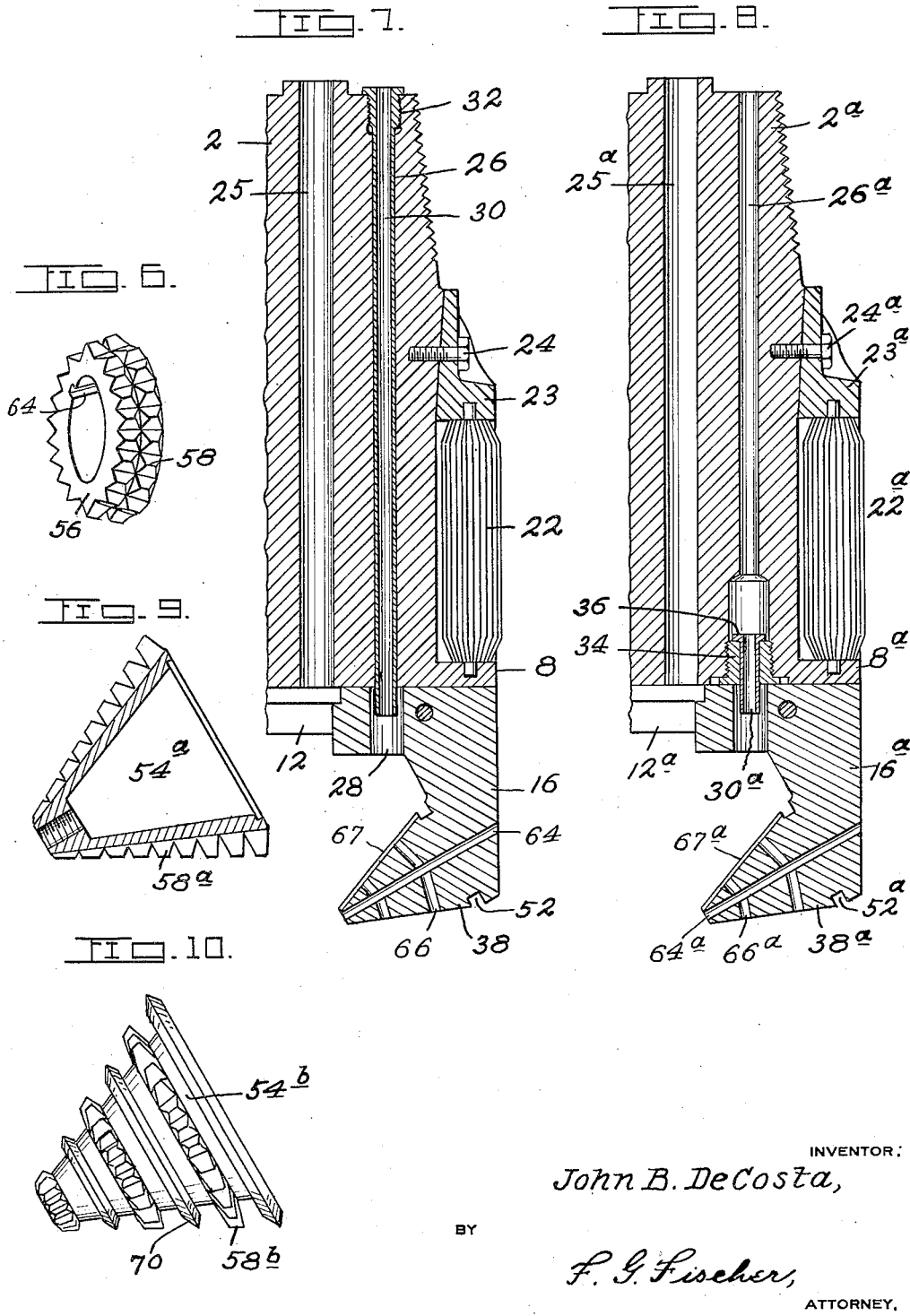

Patented Apr. 21, 1936

2,037,967

UNITED STATES PATENT OFFICE 2,037,967

ROTARY DRILL

John B. De Costa, Kansas City, Mo.

Application September 15, 1934, Serial No. 744,222

3 Claims. (Cl. 255—71)

My invention relates to drills for boring wells and it is an improvement over my U. S. Patents Nos. 1,733,336, October 29, 1929; 1,868,348, July 19, 1932, and 1,961,819, June 4, 1934.

An important feature of the present invention resides in the rotary bit or cutter which includes a number of annular cutting sections any of which can be removed for a new section when worn out without discarding the entire bit. The annular cutting sections are more rugged and easier to assemble than the straight cutting sections 28 of my last-mentioned patent, and the rotary member upon which said annular cutting sections are mounted can be manufactured at a greatly reduced cost since the grooves 30 of the rotary member 26, of the patent, are dispensed with.

Another feature resides in the ease with which the present reamers can be placed in position or removed from the drill body. This is accomplished by placing the removable bearings at the top of the reamers instead of at the bottom, as in the patent, where they could not be removed without first removing the brackets 16 which carry the rotary cutters 24.

A further feature resides in the provision of tubular linings for a number of the ducts in the drill body and in the brackets carrying the rotary cutters. As the water which flows through these ducts usually contains small particles of rock, shale, and other abrasive materials the ducts become enlarged by the wearing action of such abrasive materials unless protected by said tubular linings which are removable so that when worn out they may be discarded for new linings.

Other features will hereinafter appear and in order that the invention may be fully understood, reference will now be had to the accompanying drawings, in which:

Fig. 1 is a side view of a rotary drilling tool made in accordance with my invention.

Fig. 2 is an inverted plan view of the drilling tool.

Fig. 3 is a side elevation, partly in section, of one of a plurality of brackets with a rotary bit or cutter mounted thereon, said bit or cutter being in cross section.

Fig. 4 is a detail perspective view of a two-piece rotary member and means for holding the same in assembly.

Fig. 5 is a detail perspective view of a floating bushing upon which the rotary member is mounted.

Fig. 6 is a detail perspective view of one of the annular sections forming a part of the rotary cutter.

Figs. 7 and 8 are fragmentary vertical sectional views of the drill body showing the removable upper bearings for the reamers and the removable tubular linings for protecting the ducts in said body and the ducts in the brackets which carry the rotary cutters.

Fig. 9 is a detail sectional view of a modified form of rotary cutter formed in one piece instead of a plurality of annular sections as shown by Fig. 3.

Fig. 10 shows another modified form of rotary cutter.

Referring in detail to the different parts, 2 designates a rotary drill body comprising a stock 4 having a threaded shank 6 adapted to be screwed into the lower end of the usual drill stem, not shown. The stock 4 is reinforced in the present instance with three radially disposed ribs 8 equally spaced to leave intervening channels 10 through which the cuttings may pass while being flushed from the well.

The under side of the stock 4 and the ribs 8 are provided with radially disposed dove-tail grooves 12 for the reception of corresponding tongues 14 on the upper portion of a plurality of brackets 16 removably held in place by bolts 19. The ribs 8 are equipped with reamers 22 journaled at their lower ends in said ribs and at their upper ends in bearings 23 removably secured in place by screws 24. With the foregoing arrangement the reamers 22 may be placed in position or removed from the ribs 8 without necessitating removal of the brackets 16 as in the patents above-mentioned.

The drill body 2 is provided with ducts 25 and 26 which extend vertically through said drill body. The ducts 26 communicate with ducts 28 extending through the upper portions of the brackets 16. The ducts 25 and 26 receive water forced downwardly from the surface through the hollow drill stem to flush out the cuttings from the bottom of the well. The walls of the ducts 26 are protected by linings 30 from becoming enlarged by abrasive material carried therethrough by the water. In order that the linings 30 when worn out may be readily displaced by others, I provide their enlarged upper portions with external threads 32 for engagement with internal threads at the upper ends of the ducts 26.

In Fig. 8, I have shown a modification in the form of a short lining 30a extending loosely through a bushing 34 threaded into the lower portion of each duct 26a. The lining 30a has a circumferential flange 36 at its upper end to prevent it from dropping through the bushing 34 when the drill body 2a is in working position. With the linings 30a arranged as stated it is not necessary to remove them from the drill body 2a when it is desired to remove the brackets 16a, as said linings may be caused to slide downwardly out of the way of the brackets by merely inverting the drill body 2a. In other respects the form shown by Fig. 8 is similar to that shown by Fig. 7, as is evidenced by corresponding reference numerals with exponents a.

The brackets 16 are provided at their lower ends with conical stub shafts 38 upon which are mounted correspondingly shaped floating bushings 40. Each bushing 40 carries a freely mounted rotary member 42 comprising separate elements 43 and 44 detachably held in assembly by a resilient retaining member 46 in the form of a split ring adapted to be sprung over the reduced portions of flanges 48 and 50 on the large ends of the elements 43 and 44, respectively. The flanges 48 and 50 are adapted to project into a circumferential groove 52 in the conical stub shaft 38 and thereby hold the rotary member 42 and the bushing 40 upon the respective stub shaft 38.

Each member 42 is adapted to carry a conical rotary cutter 54 consisting, in its preferred form, of a number of annular sections 56 provided with peripheral teeth 58. The annular sections 56 are held upon the rotary member 42 by the flanges 48 and 50 and the smallest section 56, which latter is threaded upon the reduced terminal 60 of the rotary member 42. The rotary member 42 and the rotary cutter 54 are caused to rotate together by a longitudinal key 62 on the former, fitting into keyways 64 of the annular cutting sections 56. With the foregoing arrangement it is apparent that if a section 56 becomes damaged it can be readily removed from the rotary member 42, and replaced by a new section without discarding the entire rotary cutter 54.

To prevent overheating and undue wear of the stub shaft 38, the bushing 40 and the rotary member 42 from frictional contact with each other when in operation, I provide each bracket 16 with a duct 64b extending axially through the associated stub shaft 38 and communicating with lateral ducts 66 leading to the periphery of said stub shaft which also has a longitudinal peripheral duct 67, so that the water in the well may flow freely through said ducts and between said contacting surfaces. The reduced portion 60 of the rotary member 42 has an axial duct 68 communicating with the duct 64, so that the water may flow freely through the last-mentioned duct and thus prevent the same from becoming clogged with the sediment in the water.

The modified form of rotary cutter 54a, shown by Fig. 9, has peripherial teeth 58a and is made in one piece instead of a plurality of pieces like the cutter 54.

The other modified form of rotary cutter 54b, Fig. 10, may be made in sections like the cutter 54, or in one piece like the cutter 54a, as preferred, and is well adapted for working in different formations such as clay, shale, and rock. As shown the rotary cutter 54b is made up of alternately arranged annular rows of teeth 58b and smooth circular cutters 70, the former for cutting through the hard rock formations and the latter for cutting the softer formations as clay and shale.

From the foregoing description it is apparent that I have provided a rotary drill which is well adapted for the purpose intended, and while I have shown and described several forms of the invention I reserve all rights to such other forms and modifications thereof as properly fall within the spirit and scope of the invention as claimed.

Having thus described my invention, what I claim and desire to secure by Letters Patent, is:

1. In a drilling tool of the character described, a shaft having a circumferential groove adjacent one end, a two-piece rotary member mounted upon said shaft having a reduced threaded end and a circumferential flange which latter is adapted to project into said circumferential groove, resilient means for holding the component parts of said two-piece rotary member in assembly, and a plurality of annular cutting sections removably mounted upon said two-piece rotary member and one of which is threaded upon the reduced end thereof.

2. In combination in a rotary drill of the character described, a rotary drill body having a plurality of conical stub shafts, a conical two-piece rotary member mounted upon each stub shaft, split rings for holding the respective two-piece rotary members in assembly, a plurality of tapered annular cutting sections removably mounted upon each two-piece rotary member and one of which is threaded upon the reduced end of the latter, and means whereby each two-piece rotary member and the annular cutting sections mounted thereon rotate as one unit.

3. In combination in a rotary drill of the character described, a rotary drill body having a plurality of conical stub shafts each provided with a circumferential groove adjacent to its larger end, a conical two-piece rotary member mounted upon each stub shaft reduced at one end and provided near its opposite end with a circumferential flange projecting into the groove of the respective stub shaft, resilient retaining members for holding the respective two-piece rotary members in assembly, and a plurality of tapered annular cutting sections removably mounted upon each two-piece rotary member and one of which is threaded upon the reduced end of the latter.

JOHN B. DE COSTA.